(12) United States Patent
Russell et al.

(10) Patent No.: US 12,006,724 B2
(45) Date of Patent: Jun. 11, 2024

(54) SPA TUB COVER AND METHOD OF STERILIZING WATER WITHIN SPA TUB

(71) Applicants: Zachary W. Russell, Allentown, PA (US); Jeffrey T. Russell, Allentown, PA (US)

(72) Inventors: Zachary W. Russell, Allentown, PA (US); Jeffrey T. Russell, Allentown, PA (US)

( * ) Notice: Subject to any disclaimer, the term of this patent is extended or adjusted under 35 U.S.C. 154(b) by 0 days.

(21) Appl. No.: 18/486,209

(22) Filed: Oct. 13, 2023

(65) Prior Publication Data
US 2024/0125135 A1 Apr. 18, 2024

Related U.S. Application Data

(60) Provisional application No. 63/415,981, filed on Oct. 13, 2022.

(51) Int. Cl.
*E04H 4/08* (2006.01)
*C02F 1/32* (2023.01)

(52) U.S. Cl.
CPC .............. *E04H 4/08* (2013.01); *C02F 1/325* (2013.01)

(58) Field of Classification Search
CPC ..... E04H 4/16; E04H 4/12; E04H 4/08; C02F 1/325; C02F 2201/322
See application file for complete search history.

(56) References Cited

U.S. PATENT DOCUMENTS

| 3,079,498 A | * | 2/1963 | Ruffin | ............... C02F 1/325 |
| | | | | 250/437 |
| 3,971,947 A | * | 7/1976 | Lambert | ............. A01K 63/04 |
| | | | | D23/209 |

(Continued)

FOREIGN PATENT DOCUMENTS

| CA | 3057298 A1 | 9/2018 |
| CN | 207627209 U | 7/2018 |

(Continued)

OTHER PUBLICATIONS

"Spa & Hot Tub Ultraviolet (UV) Systems," Spectra Light Ultraviolet, Retrieved from: https://www.spectralightuv.com/hot-tub-spa-uv-systems Retrieved on: Sep. 6, 2022 (6 pages total).

(Continued)

*Primary Examiner* — Erin Deery
(74) *Attorney, Agent, or Firm* — John Maldjian, Esq.; Stevens & Lee PC

(57) ABSTRACT

Disclosed is a spa tub cover. The spa tub cover comprising one or more Ultraviolet (UV)-C lights integrated to an inner side of the spa tub cover such that the one or more Ultraviolet (UV)-C lights are arranged in an array configuration, and to be activated to disinfect water and/or surfaces within a spa tub; a hinge positioned between a first surface and a second surface of the spa tub cover to make the spa tub cover foldable; a switch mounted near the hinge of the spa tub cover, and to be operated for activating or deactivating the one or more Ultraviolet (UV)-C lights of the spa tub cover; and a power cord attached to the second surface of the spa tub cover for supplying power to the one or more Ultraviolet (UV)-C lights for sterilizing the water and/or within the spa tub.

20 Claims, 7 Drawing Sheets

(56) References Cited

U.S. PATENT DOCUMENTS

| | | | | |
|---|---|---|---|---|
| 4,819,276 | A | * | 4/1989 | Stevens .................. A47K 13/12 |
| | | | | 4/236 |
| 6,405,387 | B1 | | 6/2002 | Barnes |
| 8,529,770 | B2 | * | 9/2013 | Yencho .................. C02F 1/325 |
| | | | | 422/186 |
| 9,321,665 | B2 | | 4/2016 | Kolstad et al. |
| 9,598,294 | B2 | * | 3/2017 | Braunberger ......... E04H 4/1245 |
| 10,710,902 | B2 | | 7/2020 | Kasten |
| 2011/0243789 | A1 | * | 10/2011 | Roberts ................... A61L 2/10 |
| | | | | 422/116 |
| 2020/0009279 | A1 | | 1/2020 | Janssen |

FOREIGN PATENT DOCUMENTS

| | | | |
|---|---|---|---|
| CN | 207821737 | U | 9/2018 |
| CN | 211658715 | U | 10/2020 |
| CZ | 307658 | B6 | 1/2019 |
| DE | 4231334 | A1 | 4/1993 |
| JP | H1110143 | A | 1/1999 |
| JP | 2000051310 | A | 2/2000 |
| JP | 3270509 | B2 | 4/2002 |
| JP | 3126591 | U | 10/2006 |
| JP | 2006296731 | A | 11/2006 |
| JP | 2007252445 | A | 10/2007 |
| KR | 200361786 | Y1 * | 9/2004 |
| KR | 20060105717 | A | 10/2006 |
| KR | 20110099978 | A | 9/2011 |
| TW | 201929826 | A | 8/2019 |

OTHER PUBLICATIONS

"Spa UV-C T5 21W," Blue Lagoon UV-C and Pool Equipment, Retrieved from:https://www.bluelagoonuvc.com/spa-and-hot-tubs/spa-uv-c-t5-21-w/ Retrieved on: Sep. 6, 2022 (4 pages total).

"Hot tub features," Aquavia Spa, Retrieved from: https://www.aquaviaspa.com/en/features/ Retrieved on: Sep. 6, 2022 (4 pages total).

Blog, "Get Clean, Clear Hot Tub Water without using a ton of chemicals" The Sundance Spa Store, Retrieved from: https://www.thesundancespastore.com/blog/get-clean-clear-hot-tub-water-without-using-a-ton-of-chemicals/ Retrieved on: Sep. 6, 2022 (6 pages total).

G. Elliott Whitby (1989) The Treatment of Spa Waterwith Ozone Produced by UV Light, Ozone: Science & Engineering: The Journal of the International Ozone Association, 11:3, 313-324, DOI: 10.1080/01919518908552444, Retrieved from: Feb. 6, 2015 (14 pages total).

* cited by examiner

SPA TUB COVER AND METHOD OF STERILIZING WATER WITHIN SPA TUB

CROSS REFERENCE TO RELATED APPLICATION

This application claims benefit and priority to U.S. Provisional Patent Application Ser. No. 63/451,981, filed Oct. 13, 2022, entitled, "SPA COVER AND METHOD OF STERILIZING WATER WITHIN SPA" which is incorporated herein by reference in its entirety.

FIELD OF INVENTION

Embodiments disclosed herein relate, in general, to tub covers, and more particularly, to a spa tub cover and a method of sterilizing water within a spa tub.

BACKGROUND

Installation of spa tubs have increased dramatically in private homes, hotels, resort areas, and so forth. Environment and usage of the spa tubs expose water to bacteria and other contaminants, leading to their multiplication and ultimately rendering the spa tubs unhygienic or undesirable for use. Traditionally, various spa tub chemicals have been added in the spa tub water for killing bacteria, viruses, and other contaminants present in the spa tub water. However, the spa tub chemicals come at a high cost, require careful and precise dispensing into the water, and can be a constant source of maintenance challenges. Further, the spa tub chemicals can be absorbed into skin of a user and create health concerns, for example, dry skin, and irritated eyes and mucous membranes. Further, to overcome the aforementioned issues, various treatment systems have been developed.

Some spa tub systems utilize ultraviolet (UV) light treatment. However, UV light devices are often large and cumbersome, and require plumbing into an internal piping of the spa tub, which makes it difficult for the user to install such devices in the spa tubs. Some conventional spa tub covers have been designed to insulate temperatures within the spa tub, to provide safety from accidental falls into the spa tub and to keep dirt and debris out of the spa tub. However, the spa tub covers still lack in providing a provision of sterilizing the spa tub water efficiently and conveniently.

Therefore, there is a need for an improved and advanced spa tub cover that can sterilize the spa tub water in a more efficient, effective, and controllable manner.

SUMMARY

Embodiments in accordance with the present invention provide a spa tub cover. The spa tub cover comprising one or more Ultraviolet (UV)-C lights integrated to an inner side of the spa tub cover such that one or more Ultraviolet (UV)-C lights are arranged in an array configuration, and to be activated to disinfect water and/or surfaces within a spa tub. The spa tub cover further comprising a hinge positioned between a first surface and a second surface of the spa tub cover to make the spa tub cover foldable. The spa tub cover further comprising a switch mounted near the hinge of the spa tub cover, and to be operated for activating or deactivating the one or more Ultraviolet (UV)-C lights of the spa tub cover. The spa tub cover further comprising a power cord attached to the second surface of the spa tub cover for supplying power to the one or more Ultraviolet (UV)-C lights for sterilizing the water and/or surfaces within the spa tub.

Embodiments in accordance with the present invention further provide a spa tub cover. The spa tub cover comprising one or more Ultraviolet (UV)-C lights integrated to an inner side of the spa tub cover such that one or more Ultraviolet (UV)-C lights are arranged in an array configuration, and to be activated to disinfect water and/or surfaces within a spa tub. The spa tub cover further comprising one or more fixation devices adapted to secure the one or more Ultraviolet (UV)-C lights to the inner side of the spa tub cover fitted over an opening of the spa tub. The spa tub cover further comprising a hinge positioned between a first surface and a second surface of the spa tub cover to make the spa tub cover foldable. The spa tub cover further comprising a switch mounted near the hinge of the spa tub cover, and to be operated for activating or deactivating the one or more Ultraviolet (UV)-C lights of the spa tub cover. The spa tub cover further comprising a power cord attached to the second surface of the spa tub cover for supplying power to the one or more Ultraviolet (UV)-C lights for sterilizing the water and/or surfaces within the spa tub.

Embodiments in accordance with the present invention further provide a method of sterilizing water and/or surfaces within a spa tub by a spa tub cover. The method comprising steps of: enabling a user to place the spa tub cover over a spa tub and folding the spa tub cover to close an opening of the spa tub; enabling the user to turn on a switch for supplying an electrical energy from a power supply unit to one or more Ultraviolet (UV)-C lights to actuate the one or more Ultraviolet (UV)-C lights; enabling the one or more Ultraviolet (UV)-C lights to emit light rays with wavelengths in a range of 200 Nanometers (nm) to 280 Nanometers (nm) to disinfect the water and/or surfaces of the spa tub; enabling the user to turn off the switch for discontinuing a supply of the electrical energy from the power supply unit to the one or more Ultraviolet (UV)-C lights to deactivate the one or more Ultraviolet (UV)-C lights when the disinfection of the spa tub is completed by the spa tub cover; and unfolding the spa tub cover by the user to open the opening of the spa tub.

Embodiments of the present invention may provide a number of advantages depending on its particular configuration. First, embodiments of the present invention may provide a spa tub cover that may be designed to cover and protect water and/or surfaces within a spa tub from dirt, debris, and so forth.

Next, embodiments of the present invention may provide a spa tub cover that may be designed to purify and/or sterilize water within a spa tub.

Next, embodiments of the present invention may provide a spa tub cover designed to reduce or eliminate the use of spa tub chemicals, which in turn saves consumers money.

Next, embodiments of the present invention may provide a spa tub cover that is portable and may be used on any new or existing spa tub by simply replacing an old cover with the spa tub cover having affixed Ultraviolet-C (UV-C) lights.

Next, embodiments of the present invention may provide a spa tub cover that is convenient, inexpensive, and health beneficial.

Next, embodiments of the present invention may provide a spa tub cover designed with a plug-and-play means for spa tub water sterilization.

Next, embodiments of the present invention may provide a spa tub cover designed to expose circulated water of a spa tub to sterilize (UV)-C light rays, thereby ensuring sterilization efficacy of the (UV)-C lights.

Next, embodiments of the present invention may provide a means to sterilize water within a spa tub that does not utilize a spa tub cover (via the floating housing).

Next, embodiments of the present invention may provide a means to sterilize water using a line power.

Next, embodiments of the present invention may provide a means to sterilize water using a battery power.

These and other advantages will be apparent from the present application of the embodiments described herein.

The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The foregoing and other aspects of the embodiments disclosed herein are best understood from the following detailed description when read in connection with the accompanying drawings. For the purpose of illustrating the embodiments disclosed herein, there is shown in the drawings embodiments that are presently preferred, it being understood, however, that the embodiments disclosed herein are not limited to the specific instrumentalities disclosed. Included in the drawings are the following figures.

Figure 1A:
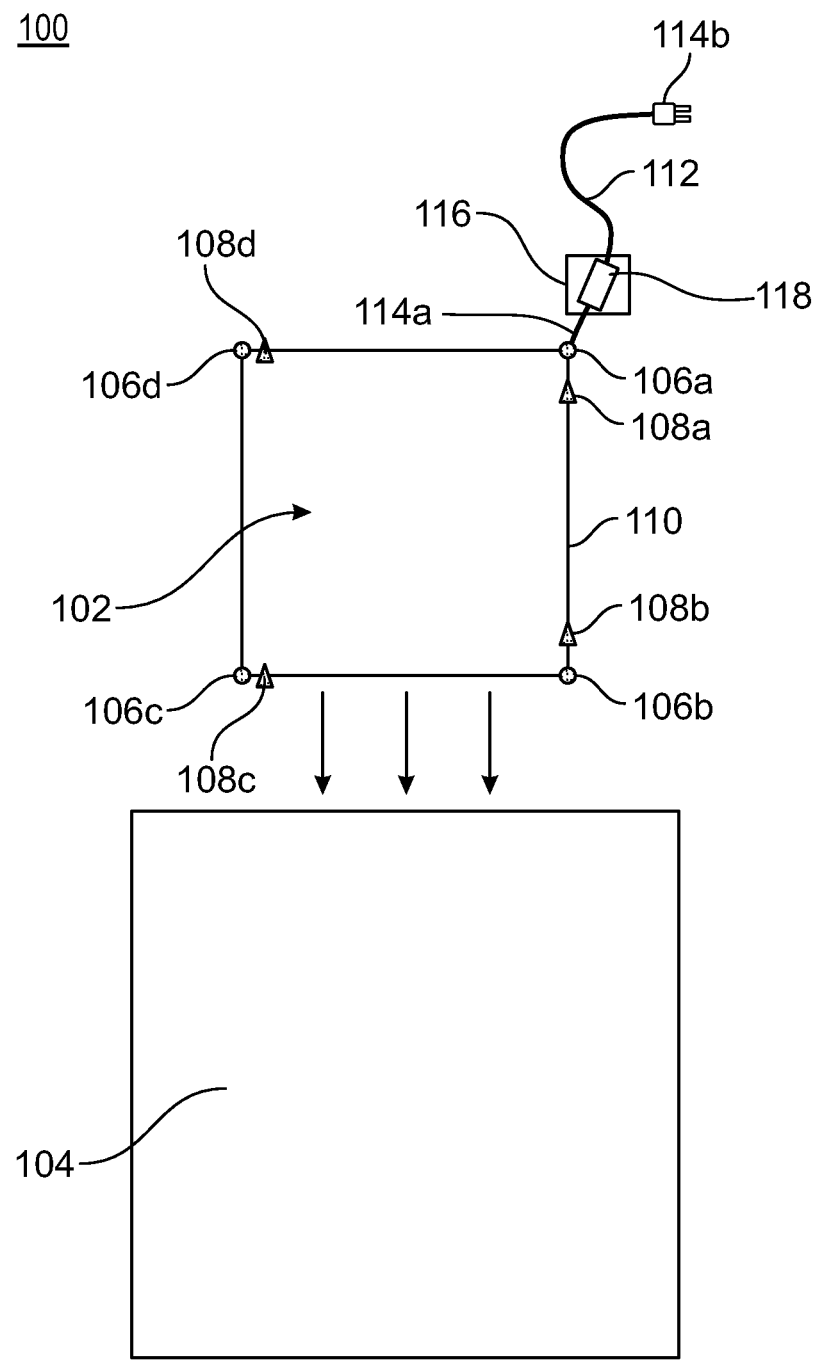
FIG. 1A illustrates a sterilization system, according to an embodiment of the present invention.

While embodiments of the present invention are described herein by way of example using several illustrative drawings, those skilled in the art will recognize the present invention is not limited to the embodiments or drawings described. It should be understood the drawings and the detailed description thereto are not intended to limit the present invention to the particular form disclosed, but to the contrary, the present invention is to cover all modification, equivalents and alternatives falling within the spirit and scope of embodiments of the present invention as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention will be described below in conjunction with an exemplary spa tub cover and method of sterilizing water and/or surfaces within a spa tub using the spa tub cover. Embodiments of the present invention are not limited to any particular type of a spa tub cover and method of sterilizing water and/or surfaces within a spa tub using the spa tub cover. Those skilled in the art will recognize the disclosed techniques may be used in any spa tub cover and method of sterilizing water and/or surfaces within a spa tub using the spa tub cover. Those of ordinary skill in the art will also recognize the devices, systems, and methods of the present disclosure can be adapted for use in connection with a swimming pool, or the like, without departing from the spirit or scope of the present disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

FIG. 1A illustrates a sterilization system 100, according to an embodiment of the present invention. According to an embodiment of the present invention, the sterilization system 100 may comprise an Ultraviolet (UV)-C sterilization unit 102 and a spa tub cover 104. In an embodiment of the present invention, the Ultraviolet (UV)-C sterilization unit 102 may be, but not limited to, a submerged Ultraviolet (UV)-C unit (discussed in FIG. 1B), a floating Ultraviolet (UV)-C unit (discussed in the FIG. 1B), and so forth. Embodiments of the present invention are intended to include or otherwise cover any type of the Ultraviolet (UV)-C sterilization unit 102 including known, related art, and/or later developed technologies.

Further, in an embodiment of the present invention, the Ultraviolet (UV)-C sterilization unit 102 may comprise Ultraviolet (UV)-C lights 106a-106d (hereinafter collectively referred to as the (UV)-C lights 106) that may be arranged in an array configuration, to be attached to an inner side of the spa tub cover 104. The (UV)-C lights 106 may be, but not limited to, (UV)-C Light Emitting Diodes (LEDs), Low-Pressure Mercury Lamps, Amalgam Lamps, (UV)-C Germicidal Tubes, and so forth. Embodiments of the present invention are intended to include or otherwise cover any type of the (UV)-C lights 106 including known, related art, and/or later developed technologies.

In an embodiment of the present invention, the (UV)-C sterilization unit 102 having the array of (UV)-C lights 106, may comprise fixation devices 108a-108d (hereinafter referred to as the fixation devices 108) to securely attach the array of (UV)-C lights 106 to the inner side of the spa tub cover 104. According to embodiments of the present invention, the fixation devices 108 may be adhesive clips, such as, but not limited to, hot melt adhesive clips, epoxy adhesive clips, cyanoacrylate (e.g., super glue) adhesive clips, construction adhesive clips, silicon adhesive clips, adhesive strips, and adhesive tape. Those of ordinary skill in the art will appreciate the fixation devices 108 can also comprise other fasteners, adhesives, compounds, and the like, which are suitable for attaching the array of (UV)-C lights 106 to the spa tub cover 104. Accordingly, embodiments of the present invention are intended to include or otherwise cover any type of the fixation devices 108 described herein, as well as other fastening devices and/or compounds, including known, related art, and/or later developed technologies that may be beneficial to attach the array of (UV)-C lights 106 to the spa tub cover 104.

Further, in an embodiment of the present invention, the array of (UV)-C lights 106 may comprise a switch (not shown) to be operated for activating or deactivating the (UV)-C lights 106 of the array. In such embodiment of the present invention, the switch may be activated for enabling a power supply unit (not shown) to supply an electrical energy to the (UV)-C lights 106. In another embodiment of the present invention, the switch may be deactivated for disabling the power supply unit to discontinue the supply of the electrical energy to the (UV)-C lights 106.

In an embodiment of the present invention, the power supply unit may be electrically connected to the (UV)-C lights 106 through a connecting wire 110. The power supply unit may be configured to supply the electrical energy to the (UV)-C lights 106 to enable an actuation of the (UV)-C lights 106. In an embodiment of the present invention, the power supply unit may be an external power supply unit that may be, but not limited to, an Alternating Current (AC) power supply unit, a Direct Current (DC) power supply unit, and so forth. In such embodiment of the present invention, a power cord 112 may be provided that may be attached to at least one of, the (UV)-C lights 106 to supply the power to all (UV)-C lights 106 through the connecting wire 110. In an embodiment of the present invention, the power cord 112 may be having a distal end and a proximal end. In such embodiment of the present invention, the distal end may refer to an end of the power cord 112 that may be farther from an external power source and closer to the (UV)-C lights 106. Further, the proximal end may refer to an end that may be closer to the external power source. In an embodiment of the present invention, the power cord 112 may be having a connector 114a that may be provided at the distal end of the power cord 112 and attached to one of, the (UV)-C lights 106. Further, the power cord 112 may be having a plug 114b that may be provided at the proximal end of the power cord 112, in an embodiment of the present invention. The plug 114b may be inserted into a wall socket to receive the power and further supply the power to the (UV)-C lights 106.

Further, in an embodiment of the present invention, the power cord 112 may comprise an enclosure 116 that may be capable to house a battery 118. The battery 118 may be the power supply unit that acts as an alternative source of power, in case the external or primary power source becomes unavailable, in an embodiment of the present invention.

Further, in an embodiment of the present invention, the spa tub cover 104 may be an existing or old spa tub cover. In another embodiment of the present invention, the spa tub cover 104 may be a new spa tub cover 104 having affixed (UV)-C lights 106. In such embodiment of the present invention, a number of the (UV)-C lights 106 that may be affixed to the spa tub cover 104 may depend upon a size and a shape of the spa tub cover 104 and a spa tub (such as, but not limited to, a conventional spa tub). In an embodiment of the present invention, the spa tub cover 104 may be designed to purify and/or sterilize water and/or surfaces of the spa tub. In an embodiment of the present invention, the water and/or surfaces of the spa tub may be purified and/or sterilized to remove impurities. In another embodiment of the present invention, the spa tub cover 104 may also be designed for protecting the spa tub and the water of the spa tub from dirt, debris, and so forth. In an embodiment of the present invention, the spa tub cover 104 may be designed to reduce or eliminate a use of spa tub chemicals, which in turn saves consumer's money. Further, in an embodiment of the present invention, the spa tub cover 104 may be designed to be portable and may be used on any new or existing spa tub by simply replacing an old cover with the spa tub cover 104 having the affixed (UV)-C lights 106.

Figure 1B:
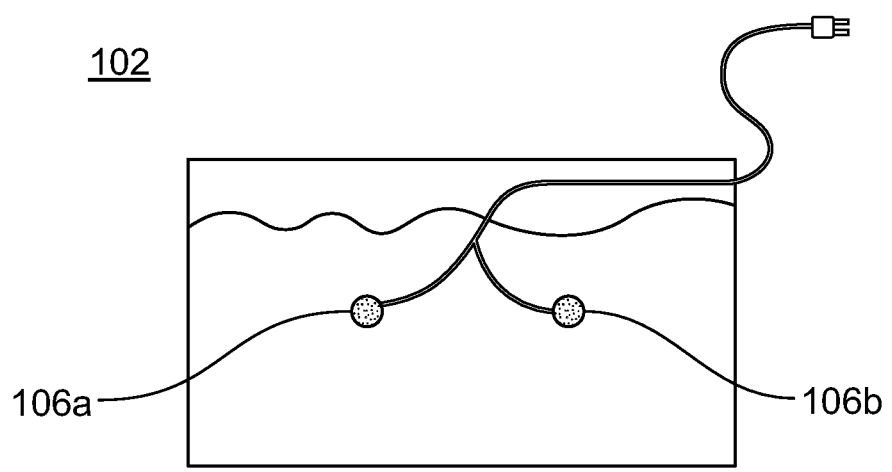
FIG. 1B illustrates a submerged Ultraviolet (UV)-C unit of an Ultraviolet (UV)-C sterilization unit, according to an embodiment of the present invention.

FIG. 1B illustrates the submerged (UV)-C unit of the (UV)-C sterilization unit 102, according to an embodiment of the present invention. The submerged (UV)-C unit may comprise the (UV)-C lights 106 that may be enclosed within a submerged housing (not shown). In an embodiment of the present invention, the (UV)-C lights 106 may be positioned in a way to emit (UV)-C radiations in all directions, ensuring that the (UV)-C radiations are dispersed into a liquid (e.g., water) where the housing is submerged. Further, in an embodiment of the present invention, the submerged housing may be equipped with a switch (not shown) that may be operated to activate and/or deactivate the (UV)-C lights 106. In an embodiment of the present invention, the (UV)-C lights 106 may be designed to activate when the submerged housing is overturned. In other words, when the submerged housing is flipped or turned upside down, it triggers the (UV)-C lights 106 to turn on automatically for ensuring that the (UV)-C lights 106 are only active when the submerged housing is in a specific orientation, like being submerged in water. In an embodiment of the present invention, the power cord 112 and the enclosure 116 of the (UV)-C lights 106 may be enclosed within the submerged housing to keep the power cord 112 and the enclosure 116 protected and dry, even when the entire (UV)-C Sterilization unit 102 is submerged in the liquid.

Further, in an embodiment of the present invention, the floating (UV)-C unit may comprise the (UV)-C lights 106 that may be contained within a floating housing (not shown). In an embodiment of the present invention, the (UV)-C lights 106 may be positioned in a way to shine downward into the liquid into which the floating housing is placed. In an embodiment of the present invention, the array of (UV)-C lights 106 may further comprise a buoyant material that may be used to keep the floating housing afloat. Further, in an embodiment of the present invention, the floating housing may be equipped with the switch, that may be operated to activate and/or deactivate the (UV)-C lights 106. In an embodiment of the present invention, the (UV)-C lights 106 may be designed to activate when the floating housing is overturned. In an embodiment of the present invention, the power cord 112 and the enclosure 116 of the (UV)-C lights 106 may be enclosed within the floating housing to keep the power cord 112 and the enclosure 116 protected and dry, even when the entire (UV)-C sterilization unit 102 is floating in the water.

Figure 1C:
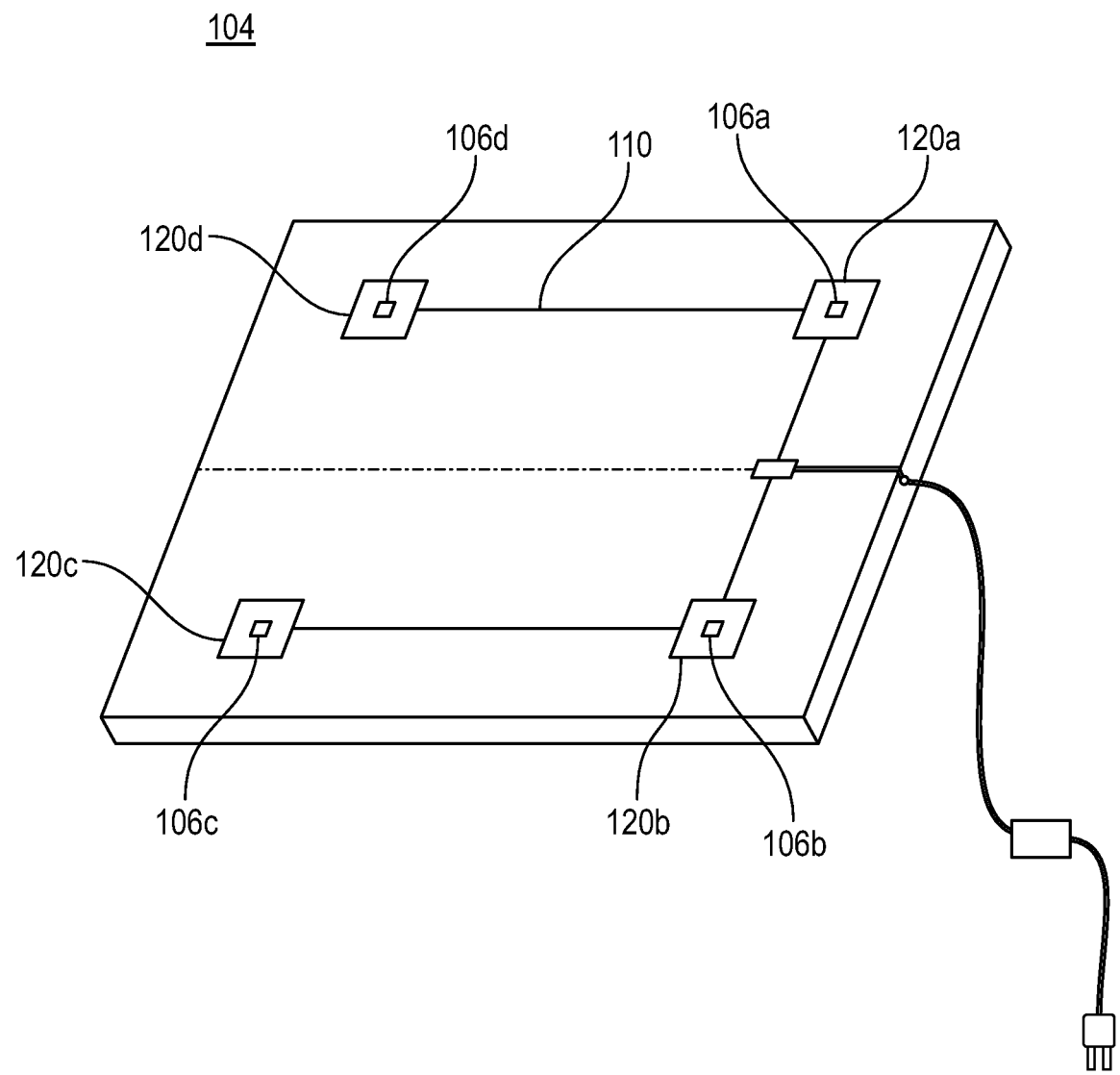
FIG. 1C illustrates a spa tub cover, according to an embodiment of the present invention.

FIG. 1C illustrates the spa tub cover 104, according to an embodiment of the present invention. More specifically, the FIG. 1C illustrates an inner side of the spa tub cover 104. In an embodiment of the present invention, the spa tub cover 104 may be made of an insulated material to prevent an electric current from passing through the spa tub cover 104 to a body of a user when the user touches the spa tub cover 104 that may be in an activated state. The spa tub cover 104 is said to be in the activated state when the power is passed through the (UV)-C lights 106 to sterilize the water and/or surface of the spa tub. In such embodiment of the present invention, the insulated material may protect the user from being injured. In an embodiment of the present invention, the insulated material may be, but not limited to, expanded polystyrene, vinyl fabric, and so forth. Embodiments of the present invention are intended to include or otherwise cover any type of the insulated material of the spa tub cover 104 including known, related art, and/or later developed technologies. In an embodiment of the present invention, the spa tub cover 104 may be made up of a transparent or a (UV)-C transmissible material such as, but not limited to, acrylic plastic, and so forth. In such embodiment of the present invention, the spa tub cover 104 may be made up of the (UV)-C transmissible material to allow the ultraviolet radiations to pass through the spa tub cover 104 to disinfect the surfaces and/or the water of the spa tub. Embodiments of the present invention are intended to include or otherwise cover any type of the (UV)-C transmissible material of the spa tub cover 104 including known, related art, and/or later developed technologies.

In an embodiment of the present invention, a shape of the spa tub cover 104 may depend on a shape of the spa tub (not shown). In an embodiment of the present invention, the spa tub cover 104 may be of any shape such as, but not limited to, a square shape, a round shape, a hexagonal shape, a rectangular shape, and so forth. Embodiments of the present invention are intended to include or otherwise cover any shape of the spa tub cover 104 including known, related art, and/or later developed technologies.

The spa tub cover 104 may be removably fitted over an opening of the spa tub, in an embodiment of the present invention. In another embodiment of the present invention, the spa tub cover 104 may be fixedly fitted over the opening of the spa tub from one side by using a hinge system (not shown). The spa tub cover 104 may be of any type, such as, but not limited to, a seal type cover, and so forth. Embodiments of the present invention are intended to include or otherwise cover any type of the spa tub cover 104, including known, related art, and/or later developed technologies. In an embodiment of the present invention, the spa tub cover 104 may be a non-foldable cover. In another embodiment of the present invention, the spa tub cover 104 may be a foldable cover. In such embodiment of the present invention, the spa tub cover 104 may be a multipoint foldable cover. In another embodiment of the present invention, the spa tub cover 104 may be a single point foldable cover. In such embodiment of the present invention, the spa tub cover 104 may be a hinged cover.

In an embodiment of the present invention, the spa tub cover 104 may comprise the (UV)-C lights 106. In another embodiment of the present invention, the spa tub cover 104 may comprise a single (UV)-C light 106. In an embodiment of the present invention, the (UV)-C lights 106 may be removably integrated to an inner side of the spa tub cover 104. In such embodiment of the present invention, the removable integration of the (UV)-C lights 106 to the inner side of the spa tub cover 104 may allow the (UV)-C lights 106 to extend or drop down from the inner side of the spa tub cover 104 to disinfect the water and/or surfaces of the spa tub up to a certain height.

In another embodiment of the present invention, the (UV)-C lights 106 may be fixedly integrated to the inner side of the spa tub cover 104. In yet another embodiment of the present invention, the (UV)-C lights 106 may be affixed on at least one of, an outer side of the spa tub cover 104, adjacent sides of the spa tub cover 104, or corners of the spa tub cover 104. In such embodiment of the present invention, the (UV)-C lights 106 may be capable to disinfect the surfaces and/or the water of the spa tub when the spa tub cover 104 is made up of the (UV)-C transmissible material. In another embodiment of the present invention, the (UV)-C lights 106 may be free floating (UV)-C lights that may be extended from one end to place within the spa tub. The (UV)-C lights 106 may be housed within watertight housings 120a-120d (hereinafter collectively referred to as the housings 120), in an embodiment of the present invention. In such embodiment of the present invention, the (UV)-C lights 106 may be housed within the housings 120 to make the (UV)-C lights 106 waterproof.

The (UV)-C lights 106 may be activated and/or deactivated manually by the user to disinfect the water and/or surfaces of the spa tub, in an embodiment of the present invention. In another embodiment of the present invention, the (UV)-C lights 106 may be activated and/or deactivated automatically to disinfect the water and/or surfaces of the spa tub on regular or customized intervals. In an embodiment of the present invention, a fixture size, a fixture quantity, a fixture type and a mounting angle of the (UV)-C lights 106 may be varied to toggle sterilization levels depending on a volume or a purity of the water in the spa tub. In an embodiment of the present invention, the spa tub cover 104 may comprise sensors (not shown) installed at the inner side of the spa tub cover 104 to detect data associated with the volume and the purity of the water in the spa tub. The purity of the water may be detected by measuring a pH level of water in the spa tub, in an embodiment of the present invention. In an embodiment of the present invention, the sensors may also be configured to detect data associated with composition of various solvents in the water within the spa tub. In such embodiment of the present invention, the sensors may be configured to detect the data associated with the composition of the various solvents in the water for determining a presence of the impurities in the water.

Figure 1D:
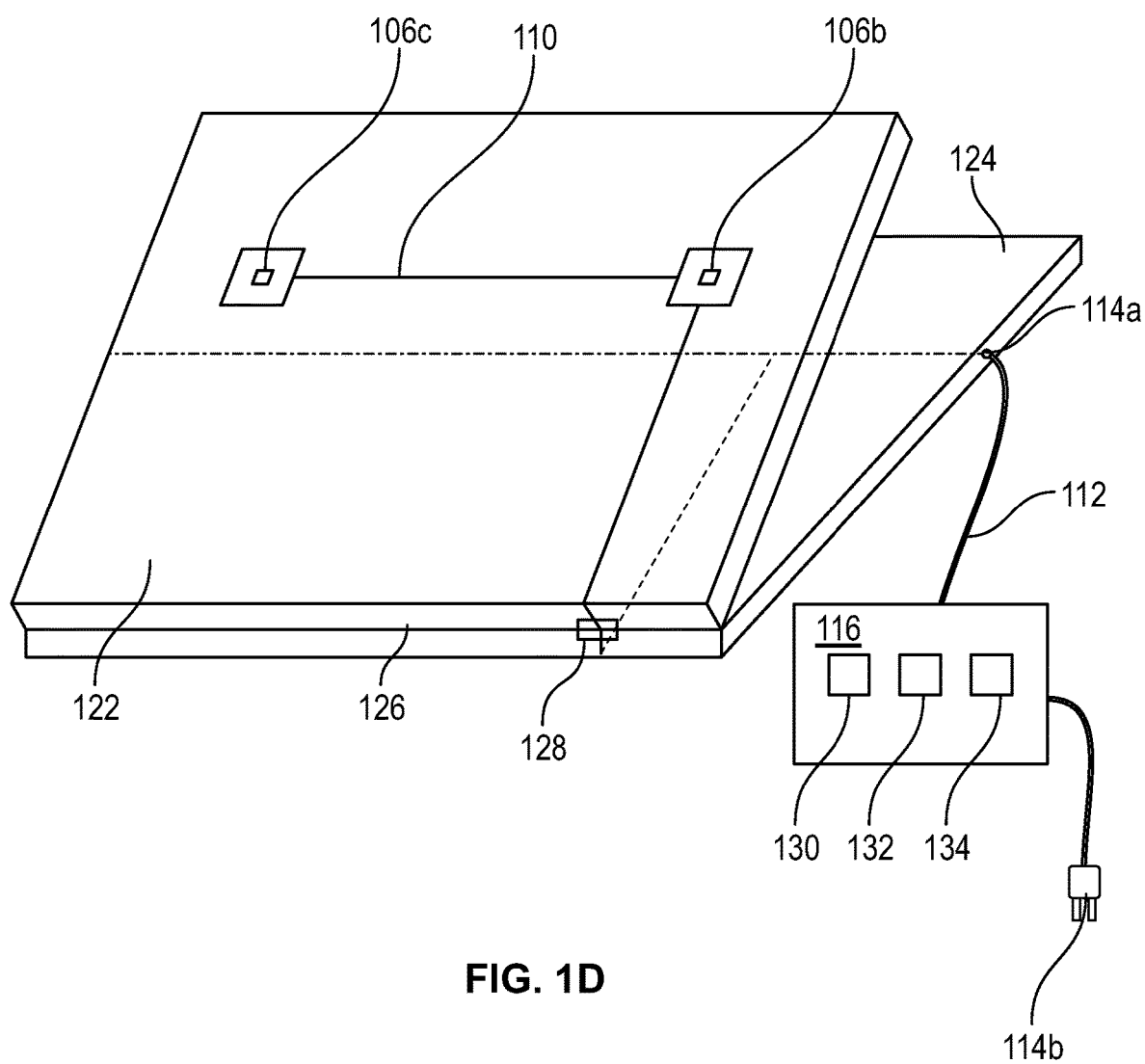
FIG. 1D illustrates a partially folded configuration of the spa tub cover, according to an embodiment of the present invention.

FIG. 1D illustrates a partially folded configuration of the spa tub cover 104, according to an embodiment of the present invention. According to embodiments of the present invention, the spa tub cover 104 may comprise a first surface 122 (i.e., the inner surface) and a second surface 124 (i.e., an outer surface). In an embodiment of the present invention, the spa tub cover 104 may comprise a hinge 126 positioned between the first surface 122 and the second surface 124 to make the spa tub cover 104 foldable. The hinge 126 may be, but not limited to, a ball bearing hinge, a spring-loaded butt hinge, a barrel hinge, and so forth. Embodiments of the present invention are intended to include or otherwise cover any type of the hinge 126 including known related art and/or later developed technologies.

The spa tub cover 104 may further comprise a switch 128 that may be mounted near the hinge 126 of the spa tub cover 104, in an embodiment of the present invention. In an embodiment of the present invention, the switch 128 may be operated by the user for activating or deactivating the (UV)-C lights 106 of the spa tub cover 104 for sterilizing the water and/or surfaces of the spa tub. In an exemplary embodiment of the present invention, the switch 128 may be activated by the user for enabling the power supply unit to supply the electrical energy to the (UV)-C lights 106. In such embodiment of the present invention, the switch 128 may be activated by the user when the spa tub cover 104 is in a closed state or in the folded configuration.

In another embodiment of the present invention, the switch 128 may be deactivated by the user for disabling the power supply unit to stop supplying the electrical energy to the (UV)-C lights 106. In such embodiment of the present invention, the switch 128 may be deactivated when the spa tub cover 104 is in an open state or in the non-folded configuration. In another embodiment of the present invention, the switch 128 may be activated automatically when the spa tub cover 104 is in the closed state and the switch 128 may be deactivated automatically when the spa tub cover 104 is in the open state. In such embodiment of the present invention, the switch 128 may be activated automatically when the first surface 122 and/or the second surface 124 of the spa tub cover 104 presses the switch 128 to be in a switch-on position while closing the spa tub cover 104. Further, the switch 128 may be deactivated automatically when the first surface 122 and/or the second surface 124 of the spa tub cover 104 presses the switch 128 to be in a switch-off position while opening the spa tub cover 104. The switch 128 may be of any type such as, but not limited to, a toggle switch, a touch switch, and alike, in an embodiment of the present invention. Embodiments of the present invention are intended to include or otherwise cover any type of the switch 128 including known, related art, and/or later developed technologies.

In an embodiment of the present invention, the power supply unit may be electrically connected to the (UV)-C lights 106 of the spa tub cover 104 through the connecting wire 110. The power supply unit may be configured to supply the electrical energy to the (UV)-C lights 106 of the spa tub cover 104 to enable an actuation of the (UV)-C lights 106 of the spa tub cover 104.

In an embodiment of the present invention, the power supply unit may be the external power supply unit that may be, but not limited to, the Alternating Current (AC) power supply unit, the Direct Current (DC) power supply unit, and so forth. In such embodiment of the present invention, the spa tub cover 104 may be provided with the power cord 112 that may be used to supply power to the (UV)-C lights 106. The power cord 112 may be having the connector 114a at the distal end and attached on the second surface 124 of the spa tub cover 104. Further, the spa tub cover 104 may be having the plug 114b at the proximal end of the power cord 112. The connector 114a of the power cord 112 may be inserted into a socket of the spa tub cover 104 and the plug 114b may be inserted into the wall socket to supply the power to the (UV)-C lights 106. The plug 114b of the power cord 112 may be of any type such as, but not limited to, a type A, a type B, a type C, and so forth. In an embodiment of the present invention, the plug 114b of the power cord 112 may be a type L. Embodiments of the present invention are intended to include or otherwise cover any type of the plug 114b, including known, related art, and/or later developed technologies.

In another embodiment of the present invention, the power supply unit may be the battery 118 (as shown in the FIG. 1A) enclosed within the enclosure 116. The battery 118 may be, but not limited to, a dry battery, a rechargeable battery, and so forth. Embodiments of the present invention are intended to include or otherwise cover any type of the battery, including known, related art, and/or later developed technologies. In an embodiment of the present invention, the rechargeable battery may be a solar battery. In an embodiment of the present invention, the solar battery may be recharged directly by a solar energy source. In another embodiment of the present invention, the solar battery may be recharged by a solar panel that may be detachably attached on a top side of the spa tub cover 104.

Further, in an embodiment of the present invention, the enclosure 116 may be configured to hold control circuit components such as, but not limited to, a timer 130, a relay 132, and a control unit 134, in an embodiment of the present invention.

Further, in an embodiment of the present invention, the timer 130 may be configured to enable the user to set a time interval for operating the (UV)-C lights 106 of the (UV)-C sterilization unit 102. In another embodiment of the present invention, the timer 130 may be having a pre-set time interval based on computer executable instructions stored in a memory (not shown) to operate the (UV)-C lights 106. In an embodiment of the present invention, the timer 130 may be set and/or pre-set to the time interval such as, but not limited to, 1 minute, 2 minutes, 4 minutes, 15 minutes, 30 minutes, and so forth. Embodiments of the present invention are intended to include or otherwise cover any time interval.

The relay 132 may be a cut-off relay that may be electrically connected to the power supply unit and the timer 130, to continue or discontinue the flow of the electrical energy to the (UV)-C lights 106 based on an output generated by the control unit 134. The relay 132 may be, but not limited to, a Coaxial relay, Latching relay, a multi-voltage relay, a Force-guided contact relay, and so forth. Embodiments of the present invention are intended to include or otherwise cover any type of the relay 132, including known, related art, and/or later developed technologies.

The control unit 134 may be connected to the power supply unit, the timer 130 and the relay 132, in an embodiment of the present invention. The control unit 134 may be configured to receive a signal from the timer 130 for controlling an operation of the (UV)-C lights 106, according to embodiments of the present invention. The control unit 134 may be, but not limited to, a Programmable Logic Control unit (PLC), a microcontroller, a microprocessor, a computing apparatus, a development board, and so forth. Embodiments of the present invention are intended to include or otherwise cover any type of the control unit 134 including known, related art, and/or later developed technologies.

In an embodiment of the present invention, the control unit 134 may be configured to energize the relay 132 to enable the flow of the electrical energy from the power supply unit to the (UV)-C lights 106. In such embodiment of the present invention, the control unit 134 may be configured to energize the relay 132 for the time interval set by the user for activating the (UV)-C lights 106 based on the received signal from the timer 130.

Further, in another embodiment of the present invention, the control unit 134 may be configured to receive the detected data from the sensors. The control unit 134 may be configured to energize the relay 132 to enable the flow of the electrical energy from the power supply unit to the (UV)-C lights 106 when the detected data deviates from a standard range. In such embodiment of the present invention, the control unit 134 may be configured to energize the relay 132 for the pre-set time interval to disinfect the water within and/or surfaces of the spa tub.

In another embodiment of the present invention, if the control unit 134 determines that the time interval set by the user and/or the pre-set time interval is reached based on a timing data of the timer 130, then the control unit 134 may be configured to de-energize the relay 132 to discontinue the flow of the electrical energy to the (UV)-C lights 106.

The spa tub cover 104 may further comprise a Ground Fault Circuit Interrupter (GFCI) (not shown) that may be installed within the power cord 112 to protect the user from severe electrical shocks, in an embodiment of the present invention. The Ground Fault Circuit Interrupter may be an automatic device that offers personal protection against lethal electrical shock or electrocution.

The spa tub cover 104 may further comprise a heat sink (not shown) surrounding the (UV)-C lights 106 in order to disburse heat generated by the operation of the (UV)-C lights 106, in an embodiment of the present invention. Further, the spa tub cover 104 may comprise thermal paste utilized to secure the (UV)-C lights 106 into the spa tub cover 104.

Figure 1E:
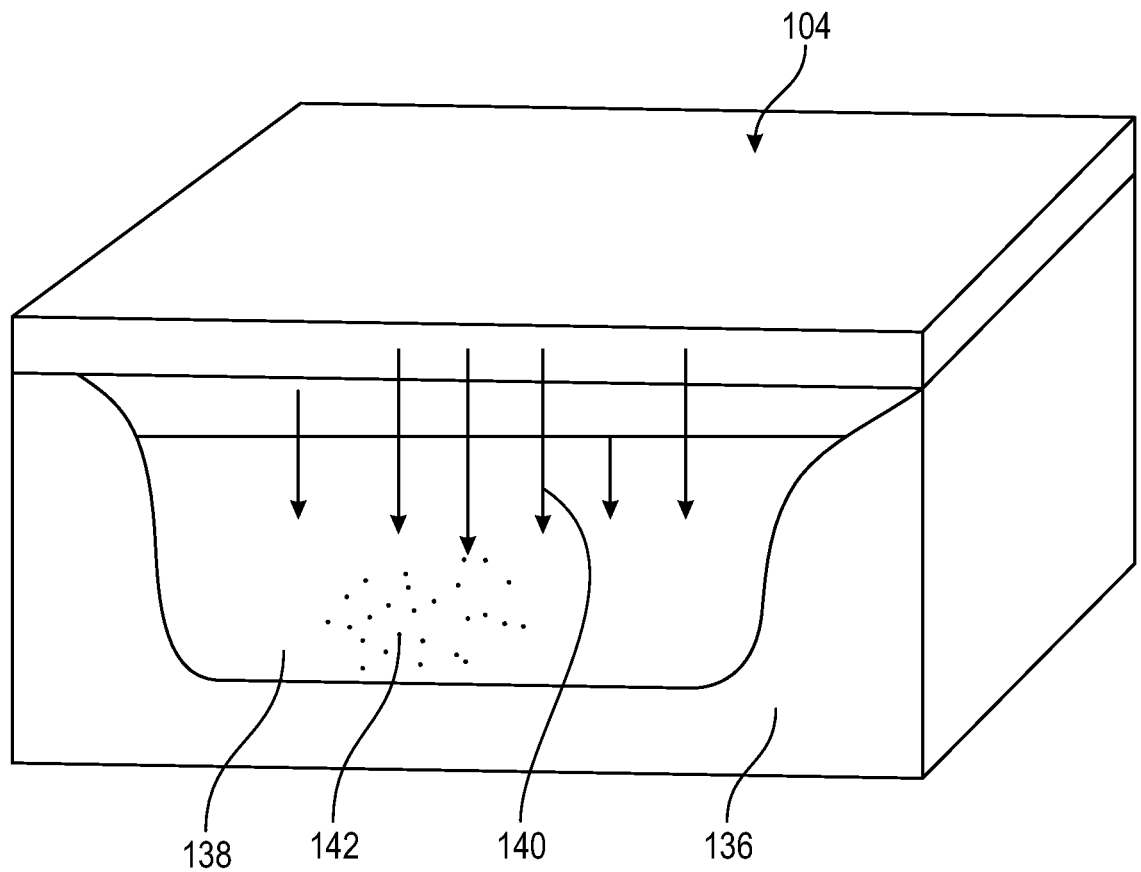
FIG. 1E illustrates the spa tub cover fitted over a spa tub, according to an embodiment of the present invention.

FIG. 1E illustrates the spa tub cover 104 fitted over a spa tub 136, according to an embodiment of the present invention. The spa tub 136 may comprise a tub 138 filled with the water that may be circulating inside the tub 138 through a motor, in an embodiment of the present invention. In an embodiment of the present invention, the (UV)-C lights 106 may be installed at the inner side of the spa tub cover 104 and may be activated to emit light rays 140 with wavelengths in a range of 200 Nanometers (nm) to 280 Nanometers (nm) to generate desired germicidal effects. In such embodiment of the present invention, when the emitted light rays 140 come into contact with contaminants 142 present in the water and/or the surfaces of the spa tub 136, then Deoxyribonucleic Acid (DNA) of the contaminants 142 may absorb energy of the (UV)-C lights 106 and thereby the contaminants 142 are rendered harmless. The contaminants 142 may be, but not limited to, bacteria, germs, virus, and so forth. Embodiments of the present invention are intended to include or otherwise cover any type of the contaminants 142 that needs to be removed from the water and/or the surfaces of the spa tub 136.

Figure 2:
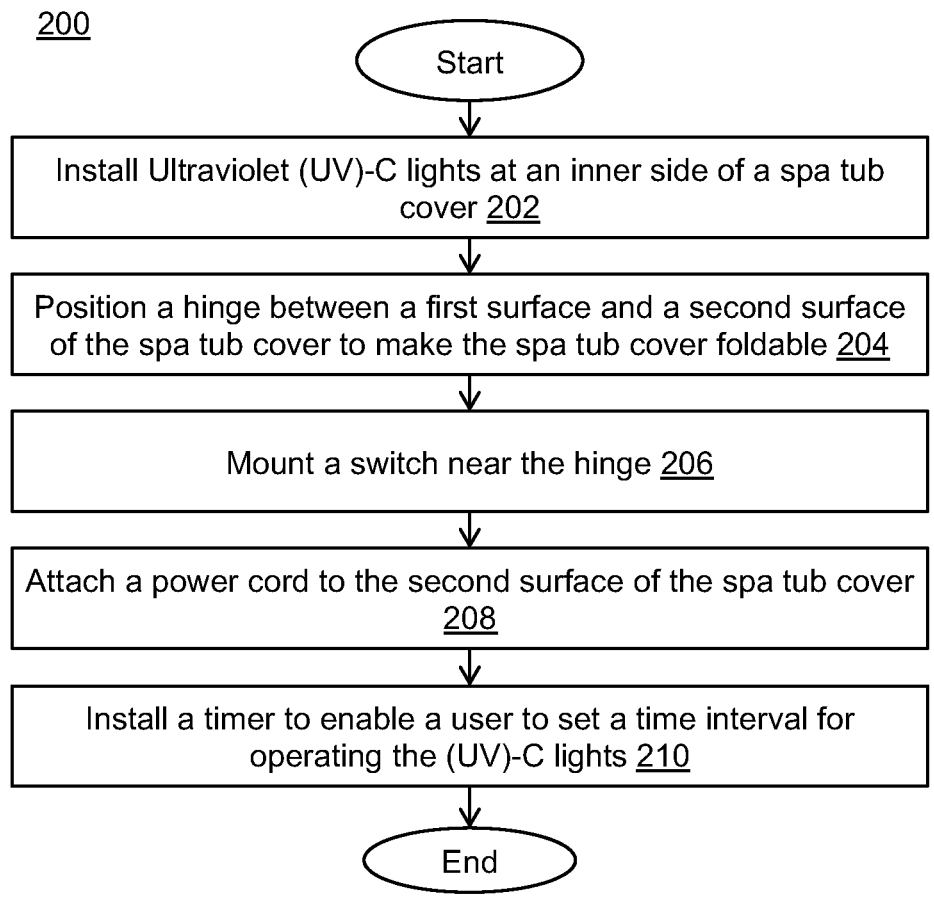
FIG. 2 illustrates a flow chart of a method of manufacturing of the spa tub cover, according to an embodiment of the present invention.

FIG. 2 illustrates a flowchart of a method 200 of manufacturing of the spa tub cover 104, according to an embodiment of the present invention.

At step 202, the spa tub cover 104 may be designed with the (UV)-C lights 106 installed at the inner side of the spa tub cover 104 for emitting the light rays 140.

At step 204, the spa tub cover 104 may be designed with the hinge 126 positioned between the first surface 122 and the second surface 124 of the spa tub cover 104 to make the spa tub cover 104 foldable.

At step 206, the spa tub cover 104 may be designed with the switch 128 mounted near the hinge 126 of the spa tub cover 104, to be activated and/or deactivated either by the user or automatically for enabling or disabling the power supply unit to supply or restrict the electrical energy to the (UV)-C lights 106.

At step 208, the spa tub cover 104 may be designed with the power cord 112 that may be used to supply the power to the (UV)-C lights 106. The power cord 112 may be attached with the second surface 124 of the spa tub cover 104.

At step 210, the spa tub cover 104 may be designed with the timer 130 to enable the user to set the time interval for operating the (UV)-C lights 106 at the regular intervals.

Figure 3:
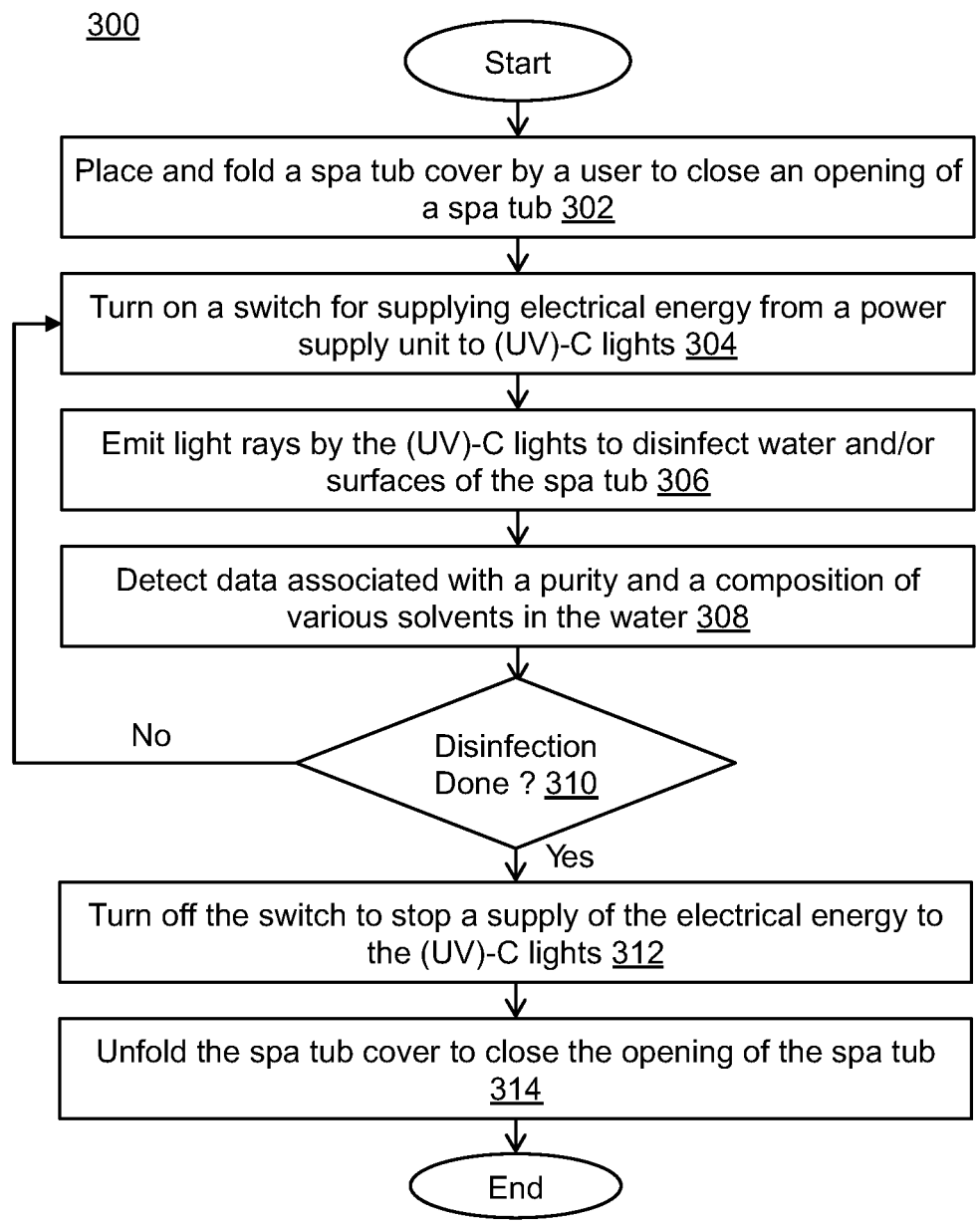
FIG. 3 illustrates a flow chart of a method of sterilizing water and/or surfaces within the spa tub by using the spa tub cover, according to an embodiment of the present invention.

FIG. 3 illustrates a flow chart of a method 300 of sterilizing the water and/or surfaces within the spa tub 136 by the spa tub cover 104, according to an embodiment of the present invention.

At step 302, the spa tub cover 104 having the first surface 122 and the second surface 124 may be placed over the spa tub 136 and further, the spa tub cover 104 may be folded by the user to close the opening of the spa tub 136.

At step 304, the user may turn on the switch 128 for supplying the electrical energy from the power supply unit to the (UV)-C lights 106 to actuate the (UV)-C lights 106.

At step 306, the (UV)-C lights 106 may emit the light rays 140 with wavelengths in a range of 200 Nanometers (nm) to 280 Nanometers (nm) to disinfect the water and/or the surfaces of the spa tub 136.

At step 308, the sensors of the spa tub cover 104 may detect the data associated with the purity and the composition of the various solvents in the water.

At step 310, the control unit 134 of the spa tub cover 104 may determine whether the disinfection of the spa tub 136 is complete or not based on the detected data. The method 300 may proceed to a step 312, when the control unit 134 determines that the disinfection is not yet completed based on the sensed data. Otherwise, the method 300 may return to the step 304 and may continue to supply the electrical energy to the (UV)-C lights 106 to emit the light rays 140.

At the step 312, the user may turn off the switch 128 for discontinuing the supply of the electrical energy from the power supply unit to the (UV)-C lights 106 to deactivate the (UV)-C lights 106 when the disinfection of the spa tub 136 is completed by the spa tub cover 104.

At step 314, the spa tub cover 104 may be unfolded by the user to open the opening of the spa tub 136.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

The exemplary embodiments of this present invention have been described in relation to a spa tub cover and method of sterilizing water within and/or surfaces of a spa tub. However, to avoid unnecessarily obscuring the present invention, the preceding description omits a number of known structures and devices. This omission is not to be construed as a limitation of the scope of the present invention. Specific details are set forth by use of the embodiments to provide an understanding of the present invention. It should however be appreciated that the present invention may be practiced in a variety of ways beyond the specific embodiments set forth herein.

A number of variations and modifications of the present invention can be used. It would be possible to provide for some features of the present invention without providing others.

The present invention, in various embodiments, configurations, and aspects, includes components, methods, systems and/or apparatus substantially as depicted and described herein, including various embodiments, sub-combinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A spa tub cover, comprising:
   one or more Ultraviolet (UV)-C lights secured to an inner side of the spa tub cover, the one or more Ultraviolet (UV)-C lights being arranged in an array and configured to disinfect water and/or surfaces within the spa tub;
   a hinge positioned between a first surface and a second surface of the spa tub cover to make the spa tub cover foldable;
   a switch mounted adjacent the hinge of the spa tub cover, and to be operated for activating or deactivating the one or more Ultraviolet (UV)-C lights; and
   a power cord attached to the second surface of the spa tub cover for supplying power to the one or more Ultraviolet (UV)-C lights configured to disinfect the water and/or surfaces within the spa tub.

2. The spa tub cover of claim 1, wherein the spa tub cover comprises Ultraviolet (UV)-C transmissible material to allow light rays to pass through the spa tub cover to disinfect the surfaces and/or water of the spa tub.

3. The spa tub cover of claim 1, wherein the one or more Ultraviolet (UV)-C lights are housed within one of, a watertight housing, a floating housing, or a submerged housing.

4. The spa tub cover of claim 1, comprising a timer enclosed within an enclosure, the timer enabling a user to set a time interval for automatically activating or deactivating the one or more Ultraviolet (UV)-C lights.

5. The spa tub cover of claim 1, wherein the one or more Ultraviolet (UV)-C lights are activated to emit light rays with wavelengths in a range of 200 Nanometers (nm) to 280 Nanometers (nm) to generate germicidal effects.

6. The spa tub cover of claim 1, comprising one or more fixation devices adapted to secure the one or more Ultraviolet (UV)-C lights to the inner side of the spa tub cover.

7. The spa tub cover of claim 1, comprising a relay enclosed within an enclosure, the relay configured to permit or discontinue a flow of an electrical energy to the one or more Ultraviolet (UV)-C lights.

8. The spa tub cover of claim 7, comprising a control unit enclosed with an enclosure to energize the relay for a time interval set by a user for activating the one or more Ultraviolet (UV)-C lights.

9. The spa tub cover of claim 1, wherein the one or more Ultraviolet (UV)-C lights are operable using one of, a line power or a battery power.

10. A spa tub cover, comprising:
    one or more Ultraviolet (UV)-C lights secured to an inner side of the spa tub cover, the one or more Ultraviolet (UV)-C lights being arranged in an array and configured to disinfect water and/or surfaces within the spa tub;
    one or more fixation devices adapted to secure the one or more Ultraviolet (UV)-C lights to the inner side of the spa tub cover fitted over an opening of the spa tub;
    a hinge positioned between a first surface and a second surface of the spa tub cover to make the spa tub cover foldable;
    a switch mounted adjacent the hinge of the spa tub cover, and to be operated for activating or deactivating the one or more Ultraviolet (UV)-C lights; and
    a power cord attached to the second surface of the spa tub cover for supplying power to the one or more Ultraviolet (UV)-C lights configured to disinfect the water and/or surfaces within the spa tub.

11. The spa tub cover of claim 10, wherein the spa tub cover comprises Ultraviolet (UV)-C transmissible material to allow light rays to pass through the spa tub cover to disinfect surfaces and/or water of the spa tub.

12. The spa tub cover of claim 10, wherein the one or more Ultraviolet (UV)-C lights are housed within at least one of, a watertight housing, a floating housing, or a submerged housing.

13. The spa tub cover of claim 10, comprising a timer enclosed within an enclosure, the timer enabling a user to set a time interval for automatically activating or deactivating the one or more Ultraviolet (UV)-C lights.

14. The spa tub cover of claim 10, wherein the one or more Ultraviolet (UV)-C lights are activated to emit light rays with wavelengths in a range of 200 Nanometers (nm) to 280 Nanometers (nm) to generate germicidal effects.

15. The spa tub cover of claim 10, comprising a relay enclosed within an enclosure, the relay configured to permit or discontinue a flow of an electrical energy to the one or more Ultraviolet (UV)-C lights.

16. The spa tub cover of claim 15, comprising a control unit enclosed with an enclosure to energize the relay for a time interval set by a user for activating the one or more Ultraviolet (UV)-C lights.

17. The spa tub cover of claim 10, wherein the one or more Ultraviolet (UV)-C lights are operable using one of, a line power or a battery power.

18. A method of sterilizing water and/or surfaces within a spa tub, comprising steps of:
    placing a spa tub cover over a spa tub and unfolding the spa tub cover to close an opening of the spa tub;
    actuating a switch to supply an electrical energy from a power supply unit to one or more Ultraviolet (UV)-C lights, thereby activating the one or more Ultraviolet (UV)-C lights, wherein the one or more Ultraviolet (UV)-C lights are configured to emit light rays with wavelengths in a range of 200 Nanometers (nm) to 280 Nanometers (nm) to disinfect the water and/or surfaces of the spa tub;

actuating the switch to discontinue the supply of electrical energy from the power supply unit to the one or more Ultraviolet (UV)-C lights, thereby deactivating the Ultraviolet (UV)-C lights when disinfection of the spa tub is completed by the spa tub cover; and folding the spa tub cover by the user to provide access to the opening of the spa tub.

19. The method of claim 18, comprising a step of energizing a relay enclosed in an enclosure for enabling a flow of the electrical energy from the power supply unit to the one or more Ultraviolet (UV)-C lights.

20. The method of claim 18, comprising a step of supplying the electrical energy to the one or more Ultraviolet (UV)-C lights through a connecting wire.

\* \* \* \* \*